(12) United States Patent
Aithal et al.

(10) Patent No.: US 12,050,926 B2
(45) Date of Patent: Jul. 30, 2024

(54) JOURNAL SPACE RESERVATIONS FOR VIRTUAL DISKS IN A VIRTUALIZED COMPUTING SYSTEM

(71) Applicant: VMWARE, INC., Palo Alto, CA (US)

(72) Inventors: Prasanna Aithal, Bangalore (IN); Prasad Rao Jangam, Palo Alto, CA (US); Srinivasa Shantharam, Bangalore (IN); Mahesh Hiregoudar, Bangalore (IN); Rohan Pasalkar, Palo Alto, CA (US); Srikanth Mahabalarao, Bangalore (IN)

(73) Assignee: VMware LLC, Palo Alto, CA (US)

( * ) Notice: Subject to any disclaimer, the term of this patent is extended or adjusted under 35 U.S.C. 154(b) by 521 days.

(21) Appl. No.: 17/463,573

(22) Filed: Sep. 1, 2021

(65) Prior Publication Data
US 2022/0391240 A1   Dec. 8, 2022

(30) Foreign Application Priority Data
Jun. 4, 2021 (IN) .............................. 202141025012

(51) Int. Cl.
*G06F 9/455* (2018.01)
*G06F 9/46* (2006.01)
*G06F 16/13* (2019.01)
*G06F 16/188* (2019.01)

(52) U.S. Cl.
CPC .......... *G06F 9/45558* (2013.01); *G06F 9/466* (2013.01); *G06F 16/13* (2019.01); *G06F 16/188* (2019.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 5,440,716 A | * | 8/1995 | Schultz | G06F 3/0632 |
| | | | | 711/170 |
| 7,577,667 B2 | * | 8/2009 | Hinshaw | G06F 16/273 |
| 8,145,604 B2 | * | 3/2012 | Day | G06F 16/1865 |
| | | | | 707/648 |

(Continued)

OTHER PUBLICATIONS

Prabhakaran, et al. "Analysis and Evolution of Journaling File Systems", 2005 USENIX Annual Technical Conference, pp. 1-16.*

*Primary Examiner* — Van H Nguyen
(74) *Attorney, Agent, or Firm* — Kim & Stewart LLP

(57) ABSTRACT

An example method of handling, at a hypervisor on a host in a virtualized computing system, a write input/output (IO) operation to a file on a storage device having a virtual machine file system (VMFS) is described. The method includes: generating logical transactions for the write IO operation having updates to metadata of the VMFS for the file; estimating, for the logical transactions, common space reservations for those of the updates to common fields in the metadata for the file; estimating, for the logical transactions, exclusive space reservations for those of the updates to exclusive fields in the metadata for the file; batching the logical transactions into a physical transaction, which includes a single reservation of space in a journal of the VMFS based on the common space reservations and a reservations of space in the journal for each of the exclusive space reservations, respectively.

18 Claims, 6 Drawing Sheets

(56) References Cited

U.S. PATENT DOCUMENTS

| | | | | |
|---|---|---|---|---|
| 8,151,032 B2* | 4/2012 | Oshins | ................ | G06F 9/45533 |
| | | | | 711/6 |
| 8,914,567 B2* | 12/2014 | Miroshnichenko | ... | G06F 3/0664 |
| | | | | 711/6 |
| 9,020,987 B1* | 4/2015 | Nanda | ................ | G06F 16/1734 |
| | | | | 707/821 |
| 9,672,245 B2* | 6/2017 | Lee | ................ | G06F 16/2379 |
| 9,916,244 B1* | 3/2018 | Tolvanen | ................ | G06F 3/065 |
| 10,296,473 B2* | 5/2019 | Benisty | ................ | G06F 13/1668 |
| 11,507,545 B2* | 11/2022 | Raju | ................ | G06F 16/1824 |
| 11,579,786 B2* | 2/2023 | Xiang | ................ | G06F 3/064 |
| 2010/0083247 A1* | 4/2010 | Kanevsky | ................ | G06F 9/45558 |
| | | | | 718/1 |
| 2019/0205244 A1* | 7/2019 | Smith | ................ | G06F 3/065 |

* cited by examiner

JOURNAL SPACE RESERVATIONS FOR VIRTUAL DISKS IN A VIRTUALIZED COMPUTING SYSTEM

RELATED APPLICATION

Benefit is claimed under 35 U.S.C. 119(a)-(d) to Foreign Application Serial No. 202141025012 filed in India entitled "JOURNAL SPACE RESERVATIONS FOR VIRTUAL DISKS IN A VIRTUALIZED COMPUTING SYSTEM", on Jun. 4, 2021, by VMware, Inc., which is herein incorporated in its entirety by reference for all purposes.

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

VMs store data on virtual disks, which are files stored on physical storage devices. For example, block storage devices can be formatted with the Virtual Machine File System (VMFS). VMFS is a journaling file system that efficiently stores files for use as virtual disks for VMs. The VMFS journal only logs metadata changes and not changes to the data. A write input/output (IO) operation to a file on VMFS requires a transaction to update VMFS metadata, which in turn involves multiple subsystems within a storage stack of the hypervisor. With the involvement of these subsystems, such a write IO operation can face a severe performance penalty, resulting in overall performance degradation. Further, in the journaled VMFS file system, the amount of journal space can be limited. Efficient use of the journal space is of importance to achieve maximum transaction parallelism and throughput. Thus, it is desirable to optimize such write IO operations and use of the journal space.

DETAILED DESCRIPTION

Figure 1:
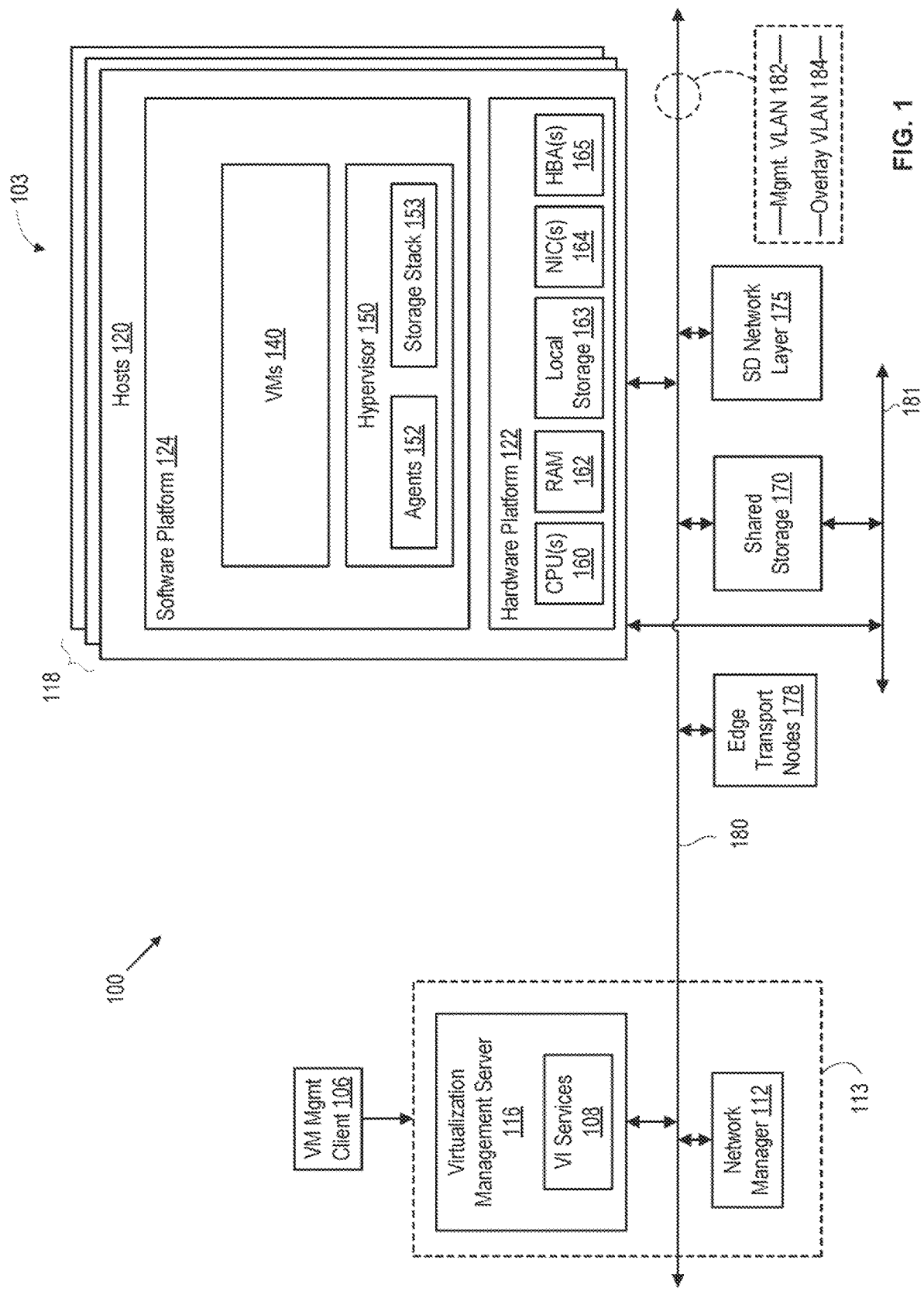
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, one or more host bust adaptors (HBAs) 165, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 can access shared storage 170 by using NICs 164 to connect to network 180. In addition or alternatively, hosts 120 can access shared storage 170 using HBAs 165 connected to a separate network 181 (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170. Hypervisor 150 includes a storage stack 153 comprising layers of software and drivers for accessing data on shared storage, as described further below.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA. An embodiment of software platform 124 is discussed further below with respect to FIG. 2.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e g., a corporate network, the public Internet, etc.). Edge transport nodes 178 can include a gateway between the internal logical networking of host cluster 118 and the external network. Edge transport nodes 178 can be physical servers or VMs.

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware. Inc. of Palo Alto, CA. If network manager 112 is absent, virtualization management server 116 can orchestrate SD network layer 175.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g, a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a distributed resource scheduler (DRS), high-availability (HA) service, single sign-on (SSO) service, virtualization management daemon, vSAN service, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

Figure 2:
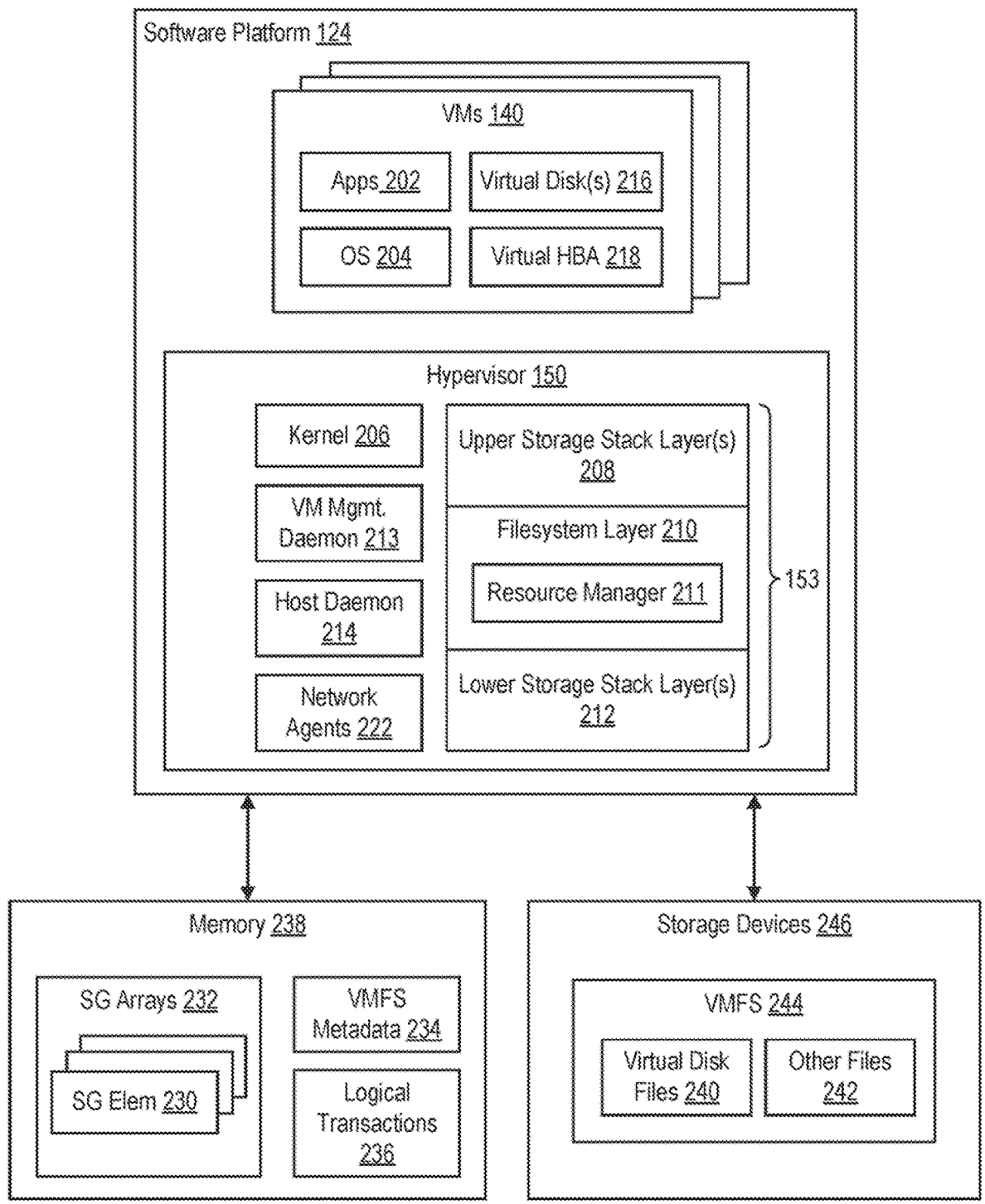
FIG. 2 is a block diagram depicting a logical relation of a software platform with respect to memory and storage devices according an embodiment.

FIG. 2 is a block diagram depicting a logical relation of software platform 124 with respect to memory and storage devices according an embodiment. As described above, software platform 124 of host 120 includes hypervisor 150 that supports execution of VMs 140. In an embodiment, hypervisor 150 includes a kernel 206, VM management daemon 213, a host daemon 214, network agents 222, and storage stack 153. Kernel 206 performs various operating system and hypervisor functions including schedule the various processes of hypervisor 150. VM management daemon 213 is an agent 152 installed by virtualization management server 116. VM management daemon 213 provides an interface to host daemon 214 for virtualization management server 116. Host daemon 214 is configured to create, configure, and remove VMs 140. Network agents 222 comprise agents 152 installed by network manager 112. Network agents 222 are configured to cooperate with network manager 112 to implement logical network services. Network agents 222 configure the respective host as a transport node in a cluster 103 of transport nodes. Each VM 140 has applications (apps 202) running therein on top of an OS 204 (also referred to as a guest OS) VMs 140 include virtual HBAs 218 configured to access virtual disks 216.

Storage stack 153 includes upper storage layer(s) 208, filesystem layer 210, and lower storage layer(s) 212. Upper storage layer(s) 208 can include, for example, a small computer system interface (SCSI) virtualization layer configured to receive SCSI operations from VMs 140 through virtual HBAs 218. Upper storage layer(s) 208 can convert SCSI operations into filesystem operations for input to filesystem layer 210, including write input/output (IO) operations. Filesystem layer 210 manages creation, use, and deletion of files stored on storage devices 246. Each storage device 246 is formatted with a Virtual Machine File System (VMFS) 244. Each storage device 246 can be an individual device (e.g., a hard disk drive) or a system of devices (e.g., a SAN, hard disk array, or the like). VMFS 244 stores virtual disk files 240 that back virtual disks 216, as well as other support files ("other files 242"). Filesystemn layer 210 converts filesystem operations into volume block operations for input to lower storage stack layer(s) 212. Filesystem layer 210 can include a resource manager 211 configured to use VMFS transactions to allocate file blocks and pointer blocks, as discussed below. Lower storage stack layer(s) 212 can include a logical volume manager configured to convert volume block operations into raw SCSI operations and a device access layer configured to apply command queuing and scheduling policies to the raw SCSI operations. Lower storage stack layer(s) 212 can further include a device driver configured to interface with NIC(s) 164 and/or HBA(s) 165 to send the raw SCSI operations to storage devices 246. Storage devices 246 can be part of shared storage 170. In other embodiments, storage devices 246 can be part of local storage 163 and lower storage stack layer(s) 212 can include a device driver for directly interfacing with storage devices 246.

Various data structures used by filesystem layer 210 can be stored in memory 238, which is part of RAM 162. Memory 238 stores scatter-gather (SG) arrays 232, VMFS metadata 234, and logical transactions 236. Each SG array includes a plurality of SG elements 230. A write IO operation received by filesystem layer 210 includes an SG array 232 as input to perform vectored IO. Each SG element 230 in SG array 232 stores an offset at which to write the data, a length of the data to be written, and an address of a memory buffer having the data to be written (i.e., an address within RAM 162). For each write IO operation targeting a file on VMFS 244, filesystem layer 210 can read in VMFS metadata 234 from VMFS 244 associated with the targeted file. In embodiments described below, filesystem layer 210 is configured to use logical transactions 236 when updating VMFS metadata on VMFS 244 during write IO operations. Filesystem layer 210 can generate multiple logical transactions 236, which are then batched into a single physical transaction issued to a storage device 246. Logical transactions 236 are discussed further below.

Figure 3:
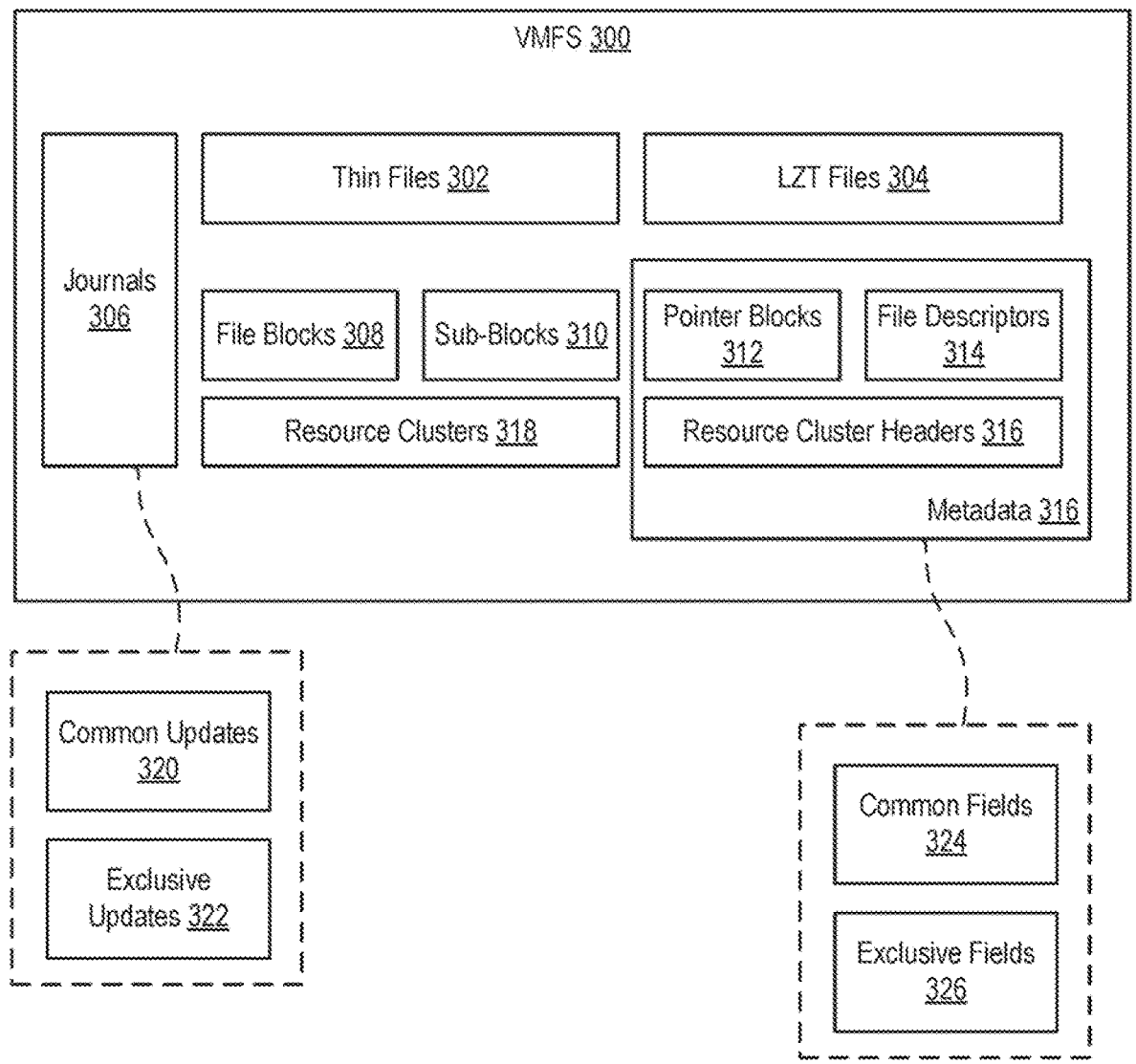
FIG. 3 is a block diagram depicting a VMFS according to an embodiment.

FIG. 3 is a block diagram depicting a VMFS 300 according to an embodiment. VMFS 300 manages block-based resources, which can include file blocks 308, sub-blocks 310, pointer blocks 312, and file descriptor blocks ("file descriptors 314"). Each file stored in VMFS 300 includes a file descriptor 314 stores various metadata for a file, which can include the size of the file and one or more addresses within storage device 246. File descriptor 314 can also store information such as file ownership, access mode (read, write, execute permissions for various users), file mode (discussed further below), and the like. File blocks 308 have a fixed size (e.g., 1 MB) and store the data of a file. In one file mode, the addresses in file descriptor 314 can point to file blocks 308 Sub-blocks 310 are similar to file blocks 308 and store data of a file. However, sub-blocks can be a smaller size that file blocks 308 (e.g., 64 KB versus 1 MB). In one file mode, the addresses in file descriptor 314 point to sub-blocks 310. Pointer blocks 312 store addresses and related metadata for file blocks 308. In some file modes, the addresses in file descriptor 314 point to pointer blocks 312. Pointer blocks 312 and file descriptors 314 comprises VMFS metadata 316 stored on storage device 246.

In embodiments, the resources (e.g., file blocks 308, sub-blocks 310) are arranged in resource clusters 318. Each resource cluster 318 includes some number of resources and is described by metadata referred to herein as a resource cluster header. Thus, metadata 316 further includes resource cluster headers 316 corresponding to resource clusters 318. Each resource cluster header 316 includes information such as the number of total and free resources in the cluster, an allocation bitmap for the resources, and the like.

In embodiments, files stored on VMFS 300 include thin files 302 and lazy-zeroed thick (LZT) files 304. A thin file 302 is a file that is only allocated blocks upon first write. For example, creating a 20 GB thin file would result in zero file blocks 308 being allocated to the file. Later, when data is written to the file, file block(s) 308 are allocated for that region of the file being written to. In embodiments, some virtual disk files 240 can be thin files 302. An LZT file 304 is a file that is fully allocated when it is created, but none of its blocks are zeroed out at the time of creation. For example, creating a 20 GB LZT file would result in 20 GB of file blocks 308 being allocated to the file, but not filled with zeros.

VMFS 300 includes journals 306. In embodiments, each host 120 accessing VMFS 300 includes its own journal 306. As noted above, VMFS 300 is a journaling file system that logs metadata updates through VMFS transactions. VMFS 300 can include other objects not shown for purposes of clarity, such as various locks used by hosts 120 to obtain exclusive access to subsets of the resources.

Filesystem layer 210 uses physical transactions to update metadata 316. Each physical transaction resources space in a journal 306 and records the metadata updates in the reserves journal space. In embodiments described below, filesystem layer 210 batches logical transactions 236 into a single physical transaction, which is then executed to record metadata updates in a journal 306. Logical transactions 236 include metadata updates and physical transactions record the aggregated metadata updates from batched logical transactions to journal space. Since journal space is limited, each physical transaction reserves journal space up front so that there is enough journal space to commit the physical transaction to the journal. To assist with journal space reservations, each logical transaction 236 estimates the amount of journal space needed for its metadata updates. When a physical transaction is created by batching a set of logical transactions, the physical transaction considers the journal space reservation estimates from all the coalesced logical transactions and reserves space in a journal 306 appropriately. One challenge in this technique is that if the space reservations from the individual logical transactions are not accurate, filesystem layer 210 either reserves excessive journal space or insufficient journal space. Reserving excessive journal space results in suboptimal logical transaction batching and inefficient use of journal space. Reserving insufficient journal space results in physical transactions being aborted since there is not enough journal space to commit, which in turn results in wasted CPU processing and less overall throughput.

Embodiments described herein mitigate journal space reservation issues by classifying the metadata updates into two categories: common updates 320 and exclusive updates 322. Common updates 320 refer to the metadata updates done to common fields 324 data structures in metadata 316 (e.g., a pointer block 312, a file descriptor 314, or a resource cluster header 316). Exclusive updates 322 refer to the metadata updates done to exclusive fields 326 of data structures in metadata 316 (e.g., a pointer block 312, a filed descriptor 314, or a resource cluster header 316).

When logical transactions are batched into a physical transaction, common fields 324 require a one-time aggregated update from all of the logical transactions. For example, a field numBlocks allocated to a file gets updated from each logical transaction. However, when the logical transactions are batched, there is only one update required to numBlocks, which is the aggregate of all updates to numBlocks from all logical transactions. The same holds for any common field 324. Thus, filesystem layer 210 can have a single journal space reservation for all common updates 320 in a physical transaction.

In contrast to common updates 320, exclusive updates 322 are exclusive to their respective logical transactions. Updates to exclusive fields 326 need their own individual journal space reservations in the physical transaction. For example, a block address allocated to an offset of a file needs to be updated separately from each of the batched logical transactions that target different offsets of the file. That is, each exclusive updates 322 requires a separate journal space reservation from each logical transaction 236 being coalesced in the physical transaction.

In embodiments, three metadata structures in metadata 316 are updated as part of a VMFS transaction: file descriptor 314, pointer block(s) 312, and resource cluster header(s) 316. File descriptor 314 is the on-disk representation of the file and includes file metadata and addressing information. Pointer block 312 is an on-disk metadata block that includes a collection of addresses. Resource cluster header 316 is an on-disk metadata block including information related to the collection of resources on the file system. For example, a resource cluster header 316 can include metadata for a resource cluster 318 of 512 resources (e.g., 512 file blocks 308).

A file descriptor 314 can include the following fields, which are common fields 324 in metadata 316:
A.1] flags—The field indicates if the file is Thin or Lazy zeroed thick or Eager Zeroed thick
A.2] afntyNumRCsPerBit—The field indicates number of resource clusters represented by a bit inside "Affinity information Bitmap" field [A.16] mentioned below.
A.3] afntyBitmapStartSFBC—The field indicates the starting resource cluster of the range of resource clusters represented by "Affinity information Bitmap" field [A.16] mentioned below.
A.4] afntyNumBitsSet—The field indicates the number of bits set inside "Affinity information Bitmap" field [A.16] mentioned below.
A.5] afntyFirstBitSet—The field indicates the first bit set inside "Affinity information Bitmap" field [A.16] mentioned below.
A.6] lastSFBClusterNum—The field indicates the last resource cluster from which file block allocated to a file.
A.7] lastFreeSFBClusterNum—The field indicates the last resource cluster from which file block was freed from a file.
A.8] sfbcAllocatedFrom—This field is an array of resource cluster numbers indicating those resource clusters from which file blocks were allocated to a file.
A.9] numTracked—This field indicates the number of entries stored inside "sfbcAllocatedFrom" field [A.8] mentioned above.
A.10] numBlocks—This field indicates the total number of file blocks allocated to a file.
A.11] ctime—This field indicates the file last access time stamp.
A.12] numTBZBlocks—This field indicates the number of file blocks that are marked to be zeroed out i.e. not yet zeroed out.
A.13] numNewBlocksSinceEpoch—This field was supposed to be used conjunction with deprecated feature of VMFS. Currently, this field indicates the total number of file blocks allocated to a file.
A.14] numPointerBlocks—This field indicates the number of pointer blocks allocated to a file.
A.15] numNonWrittenBlocks—This field indicates the number of allocated file blocks that are fully TBZed. This field is analogous to field [A.12].
A.16] Affinity information Bitmap—This field contains the bitmap in which every set bit indicates that the file has a resource cluster allocated from the portion of a file system that is indicated by the set bit.

A file descriptor 314 can include the following fields, which are exclusive fields 326 in metadata 316:
A.17] File block address—This field contains the list of file block addresses that are allocated to a file.
A.18] Pointer Block address—This field contains the list of pointer block addresses that are allocated to a file.
A.19] Double Pointer block address—This field contains the list of double pointer block addresses that are allocated to a file.

A pointer block 312 can include the following field, which is an exclusive field 326 in metadata 316: B I] File Block Addresses: VMFS pointer block has the file block addresses of those file blocks allocated to a file.

A resource cluster header 316 can include the following fields, which are common fields 324 of metadata 316.
C.1] freeResources—This field indicates total number of free resources indicated by a given resource cluster.
C.2] pendingUnmaps—This field indicates total number of resources indicated by a given resource cluster that are required to be UNMAP'd.
C.3] freeLockedForUnmap—This field indicates total number of resources indicated by a given resource cluster that are free and are locked for UNMAP by owner server.
C.4] writerInfo—This field contains information of a server that writes the given resource cluster.

A resource cluster header 316 can include the following fields, which are exclusive fields 326 of metadata 316.
C.5] freeBitmap—This field is a bitmap containing a single bit per resource indicating if the resource is free or allocated.
C.6] unmapBitmap—This field is a bitmap containing a single bit per resource indicating if the resource is marked for UNMAP or not.
C.7] affinityCount—This field indicates the number of files to which resources are allocated from a given resource cluster.

Those skilled in the art will appreciate that the above-described common fields 324 and exclusive fields 326 are exemplary and that metadata 316 can include various other types of common fields and exclusive fields, as well as including data structures other than file descriptors 314, pointer blocks 312, and resource cluster headers 316.

Figure 4:
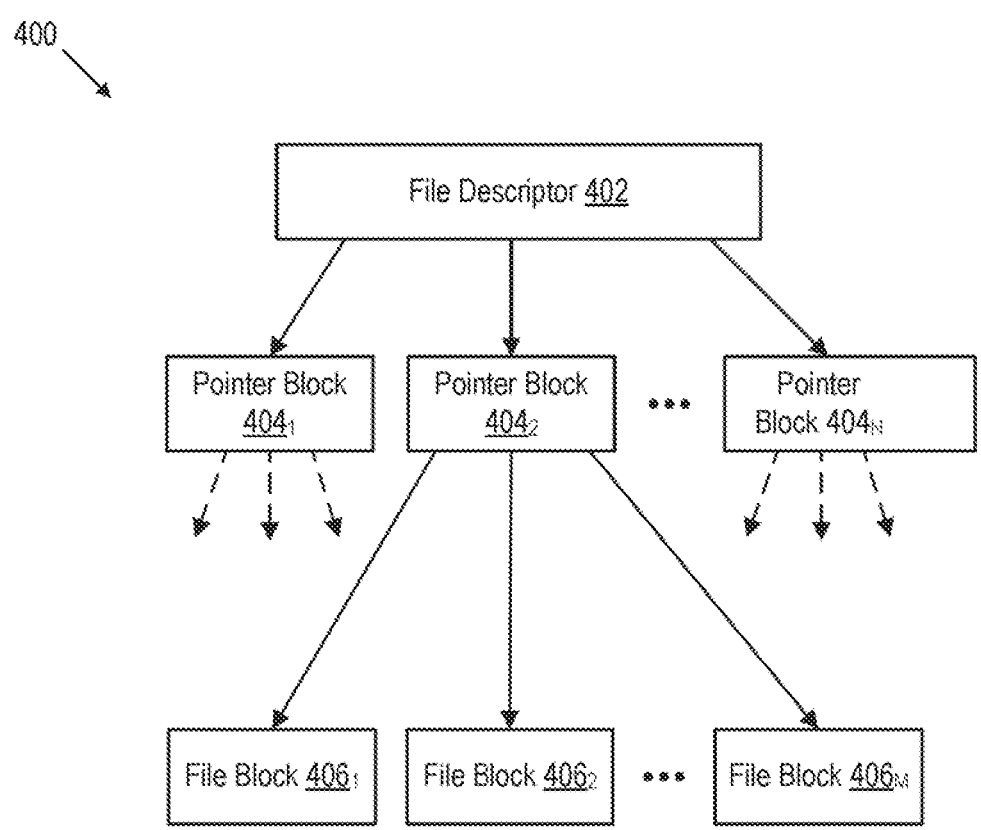
FIG. 4 is a block diagram depicting a file stored on a VMFS according to an embodiment.

FIG. 4 is a block diagram depicting a file 400 stored on a VMFS according to an embodiment. File 400 comprises a file descriptor 402, one or more pointer blocks 404 (e.g., pointer blocks $404_1 \ldots 404_N$, where N is an integer greater than zero), and one or more file data blocks 406 (e.g., file blocks $406_1 \ldots 406_M$, where M is an integer greater than zero). File descriptor 402 is a block of storage device 246 or a data object located within a block of storage device 246. A pointer block 404 is a block of storage system 104 or a data object located within a block of storage system 104. File descriptor 402 is a root of file 400. File descriptor 402 stores metadata of file 400 as discussed above. The metadata in file descriptor 402 can include a mode for file 400. In an embodiment, the file mode can be set to small data, direct address, single indirect address, and double indirect address. The value of the mode is based on the length of the file and the file block size. In the direct address mode, addresses in file descriptor 402 directly point to file blocks 406 (i.e., pointer blocks 404 are omitted). In the single indirect address mode, addresses in file descriptor 402 point to pointer blocks 404 (known as indirect pointer blocks), and addresses in pointer blocks 404 point to file blocks 406. In the double indirect address mode, addresses in file descriptor 402 point to a first level of pointer blocks (known as double-indirect pointer blocks), addresses in the first level pointer blocks point to a second level of pointer blocks (indirect pointer blocks), and addresses in the second level of pointer blocks point to the file blocks. Thus, there can be more than one level of pointer blocks 404. In the small data mode, addresses in file descriptor 404 point to sub-blocks 310 (not shown in the example of FIG. 4).

The addresses in file descriptor 402 and pointer blocks 404 may be logical or physical addresses. A logical address is the address at which data appears to reside from the perspective of a guest OS within VM 140. A logical address may be different from the physical address due to the operation of an address translator or mapping function. Such mapping function may be, for example, maintained in pointer blocks 404, where file offsets are mapped to a volume address of storage device 246. It should be noted that the volume address itself may not be a physical address but may be a logical address that is translated to a physical address of storage device 246 by components of shared storage 170.

A block within storage system 104 (e.g., block containing file descriptor 402, pointer block 404, or file block 406) may be, for example, 4 KB, 16 KB, 1 MB, or 32 MB in size. In an embodiment, file descriptor 402 is 4 KB, pointer block 404 is 64 KB, and file block 406 is 1 MB but can range from 1 MB to 16 MB in size.

File blocks 406 contain data of file 400, while file descriptor 402 and pointer blocks 404 contain metadata of file 400 As used herein, "data" of a file is the data that an application or guest OS may utilize directly. As used herein, "metadata" of a file is data that describes aspects of the data written, being written, or to be written to file blocks 406 of storage device 246. As used herein, "data" of file 400 includes information stored within file block(s) 406 of file 400 and does not typically include information stored within file descriptor 402 of file 400 and information stored within pointer block(s) 404 of file 400. As used herein, "metadata" of file 400 includes information that is stored or that will be stored within file descriptor 402 of file 400 and within pointer block(s) 404 of file 400. In an embodiment, "metadata" does not typically include information stored within file block(s) 406 of file 400.

Each pointer block 404 also includes metadata that indicates whether file blocks 406, to which that pointer block 404 points, have been zeroed and allocated. For example, each indirect pointer block can include a plurality of addresses 408, each of which includes metadata having at least a to-be-zeroed (TBZ) field. If the TBZ field is set, the file block pointed to by the address has not been zeroed. If the TBZ field is unset, the file block pointed to by the address has been zeroed. As used herein, to zero a storage block means to fill in zeroes in all data storage positions of the storage block. In an embodiment, the zeroing may be accomplished by sending the SCSI UNMAP command to storage device 246, indicating which file block 406 to unmap, by sending zeroed buffers, or by sending a SCSI UNMAP/TRIM command.

Figure 5:
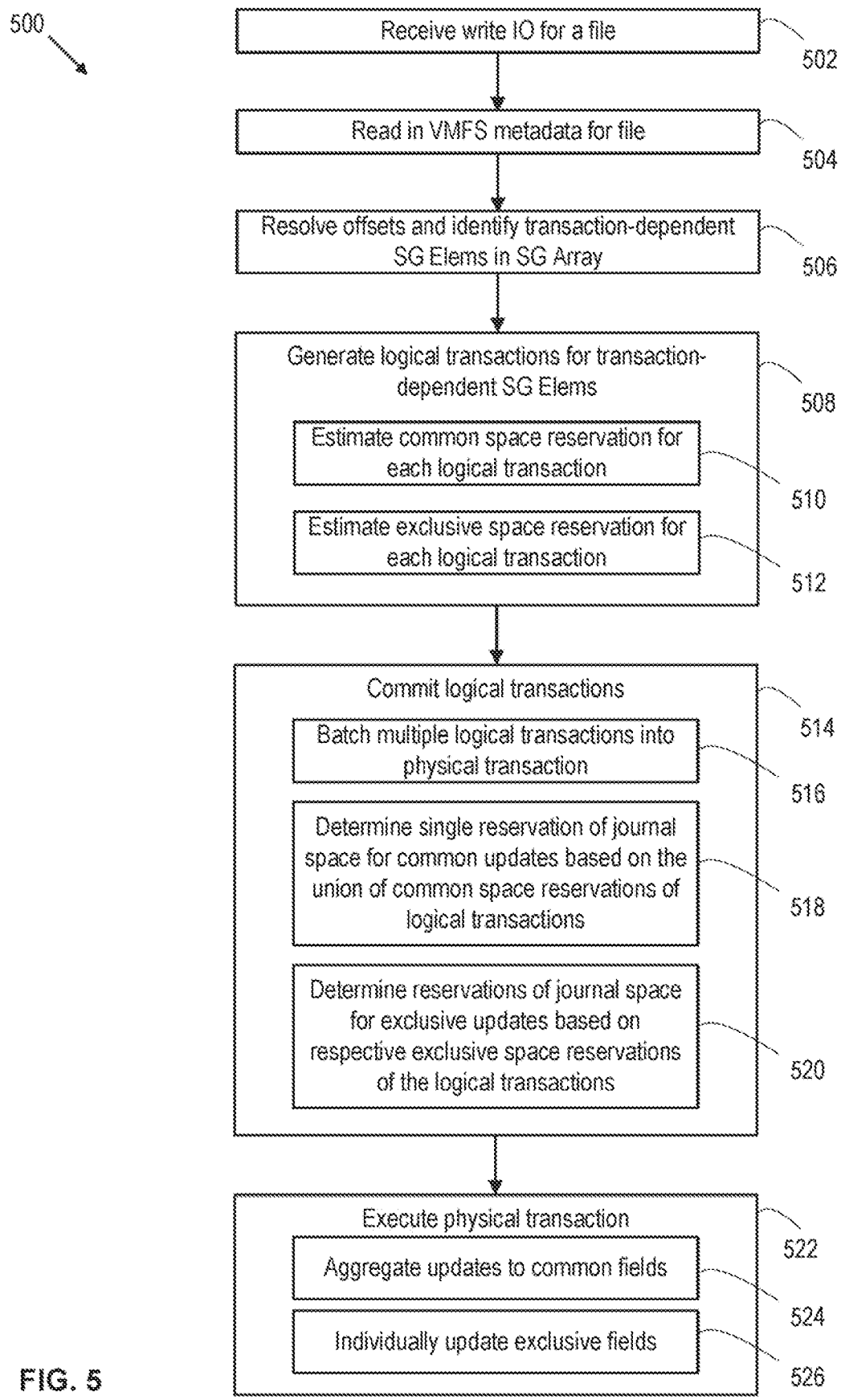
FIG. 5 is a flow diagram depicting a method of handling a write IO operation in a hypervisor.

FIG. 5 is a flow diagram depicting a method 500 of performing a transaction for a write IO to a file according to an embodiment. Method 500 begins at step 502, where filesystem layer 210 receives a write IO operation for a file from a VM 140. For example, a VM 140 may be writing to a virtual disk 216 attached thereto and the target file is a virtual disk file 240 (e.g., a thin file 302 or LZT file 304) on a VMFS-formatted storage device. The write IO operation includes an SG array 232 created by VM 140. At step 504, filesystem layer 210 reads in VMFS metadata 316 for the file from storage device 246 (e.g., file descriptor and pointer blocks) and stores it in memory 238 (VMFS metadata 234).

At step 506, filesystem layer 210 resolves the offsets in SG elems of the SG array and identifies transaction-dependent SG elems. The process for resolving a write offset in an SG elem outputs the address of a file block mapped to the offset, if the file block is allocated or not, and if the file block is allocated, whether the file block is zeroed or not. Filesystem layer 210 determines whether a VMFS transaction is required for each resolved offset. A write IO issued to a file requires a transaction for VMFS metadata updates in the following cases: 1) a write operation targets a portion of a file to which no file block is yet allocated; or 2) a write operation targets a portion of a file to which a file block has been allocated but has yet to be zeroed. For the second case, as part of a write to such a file block, the TBZ field associated with the file block address needs to be reset when the file block is zeroed on the storage device. If the write operation targets a portion of a file to which a file block has been allocated and zeroed, then no transaction is required, since there is no VMFS metadata that needs to be updated.

At step 508, filesystem layer 210 generates logical transactions for the transaction-dependent SG Elems. Each logical transaction describes one or more write IOs to be performed on the storage device. For example, filesystem layer 210 can invoke resource manager 211 to allocate blocks (file blocks, pointer blocks) and update VMFS metadata 234 using logical transactions. As described above, updates to VMFS metadata 234 are categorized into common updates and exclusive updates. At step 510, filesystem layer 210 estimates a common space reservation for each logical transaction. The common space reservation accounts for metadata update(s) to one or more common fields in VMFS metadata 234 for the respective logical transaction. At step 512, filesystem layer 210 estimates an exclusive space reservation for each logical transaction. The exclusive space reservation accounts for metadata update(s) to one or more exclusive fields in VMFS metadata 234 for the respective logical transaction.

Figure 6:
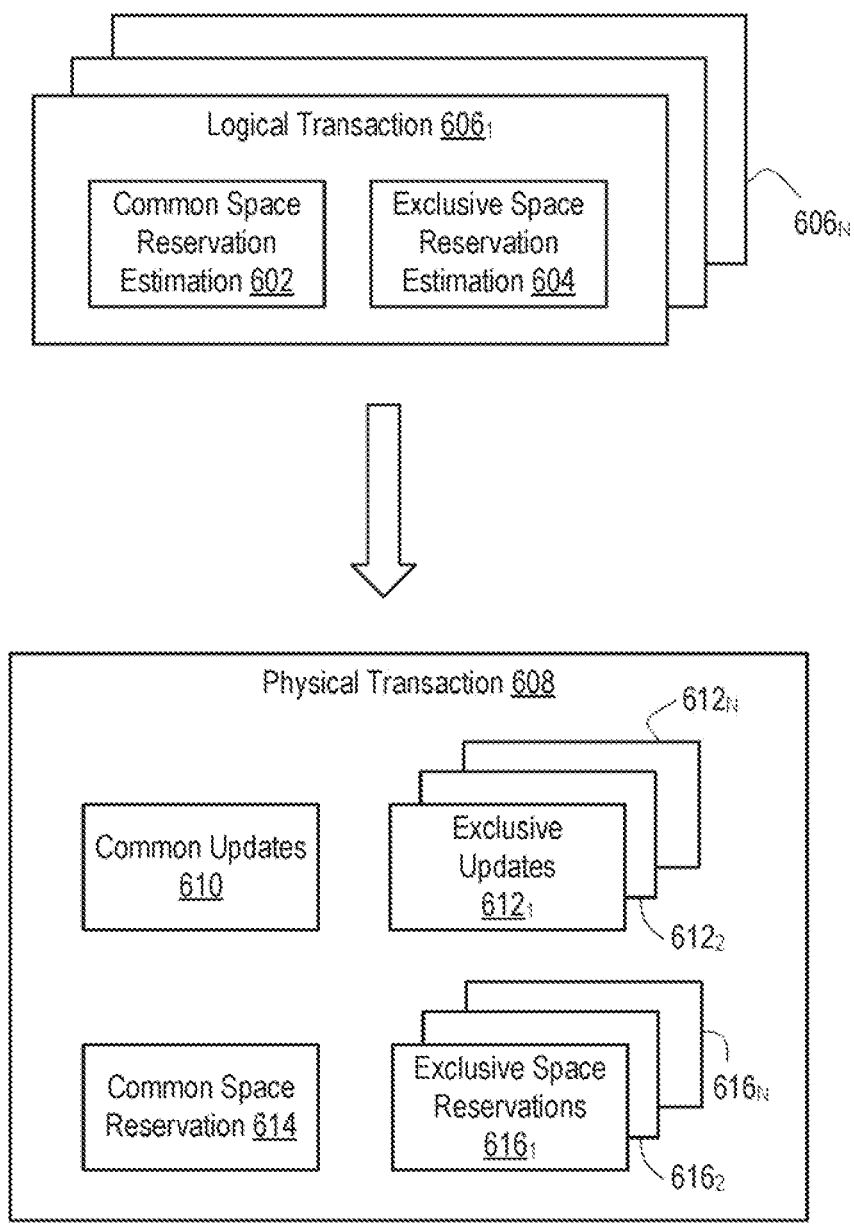
FIG. 6 is a block diagram illustrating a set of logical transactions being batched into a physical transaction according to an embodiment.

FIG. 6 is a block diagram illustrating a set of logical transactions being batched into a physical transaction according to an embodiment. The set of logical transactions includes logical transactions $606_1 \ldots 606_N$, where N is an integer greater than one ("logical transactions 606"). Each of the logical transactions 606 includes a common space reservation estimation 602 and an exclusive space reservation estimation 604.

Returning to FIG. 5, at step 514, filesystem layer 210 commits the logical transactions. In particular, at step 516, filesystem layer 210 batches multiple logical transactions into a physical transaction targeting the file on the storage device. At step 518, filesystem layer 210 determines a single reservation of journal space for common updates to VMFS metadata 234 by taking the union of the common space reservation estimations of the logical transactions in the batch. Effectively, the journal space reservation for the common updates is the size of the largest common space reservation estimation in the batch of logical transactions. At step 520, filesystem layer 210 determines reservations of journal space for exclusive updates to VMFS metadata 234 based on respective exclusive space reservation estimations of the logical transactions. The total journal space reservation for the exclusive updates is the size of the sum of the exclusive space reservation estimations across the logical transactions being batched. In this manner, filesystem layer 210 reserves journal space optimally by reserving space for the exclusive updates separately while avoiding wasting space with a one-time reservation for common updates.

At step 522, filesystem layer 210 executes the physical transaction to commit the VMFS metadata updates to the journal and write the metadata to the file on the storage device. During execution of the physical transaction, filesystem layer 210 reserves space in the journal according to the space reservations determined in steps 518 and 520. During execution of the physical transaction, at step 524, filesystem layer 210 aggregates updates to the common fields from all of the logical transactions. That is, each common field is updated once by aggregating all of the updates to the common field found across the logical transactions. At step 526, file system layer 210 individually updates the exclusive fields from the logical transactions. That is, each exclusive field is updated based on a respective exclusive field update in a respective logical transaction.

Method 500 includes steps for performing a physical transaction to update VMFS metadata in response to a write IO operation. Other steps performed by filesystem layer 210 to perform the write IO operation have been omitted for clarity. Such other steps include, for example, performing a synchronous write operation to zero out file blocks and issuing asynchronous write operation(s) to write the data identified by the SG Elems in the SG array. Additional steps include monitoring for any errors and reporting success or failure of the write IO operation.

Returning to FIG. 6, logical transactions 606 are batched into physical transaction 608. Physical transaction 608 includes a common space reservation 614 determined as the union of common space reservation estimations 602 of the logical transactions 606. Physical transaction includes exclusive space reservations $616_1 \ldots 616_N$ determined from exclusive space reservation estimations 604 of logical transactions $606_1 \ldots 606_N$, respectively. Physical transaction 608 includes common updates to VMFS metadata to be stored in the common space reservation 614 on the journal, and exclusive updates $612_1 \ldots 612_N$ to be stored in the exclusive space reservations $616_1 \ldots 616_N$, respectively.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of handling, at a hypervisor on a host in a virtualized computing system, a write input/output (IO) operation to a file on a storage device having a virtual machine file system (VMFS), the method comprising:
generating logical transactions for a scatter-gather array of the write IO operation having updates to metadata of the VMFS for the file;

estimating, for the logical transactions, common space reservations for those of the updates to common fields in the metadata of the VMFS for the file;

estimating, for the logical transactions, exclusive space reservations for those of the updates to exclusive fields in the metadata of the VMFS for the file;

batching the logical transactions into a physical transaction, the physical transaction including a single reservation of space in a journal of the VMFS based on the common space reservations and a reservations of space in the journal of the VMFS for each of the exclusive space reservations, respectively; and executing the physical transaction to commit the updates to the metadata of the VMFS to the journal of the VMFS.

2. The method of claim 1, wherein the common fields and the exclusive fields are fields in a plurality of data structures having the metadata of the VMFS for the file.

3. The method of claim 2, wherein the plurality of data structures include file descriptors, pointer blocks, and resource cluster headers.

4. The method of claim 1, wherein the single reservation of space in the journal of the VMFS is determined from a union of the common space reservations of the logical transactions.

5. The method of claim 1, wherein the physical transaction includes aggregated updates to the common fields in the metadata of the VMFS aggregated from the logical transactions.

6. The method of claim 1, wherein the physical transaction includes individual updates to the exclusive fields in the metadata of the VMFS respectively from each of the logical transactions.

7. A non-transitory computer readable medium comprising instructions to be executed in a computing device to cause the computing device to carry out a method of handling, at a hypervisor on a host in a virtualized computing system, a write input/output (IO) operation to a file on a storage device having a virtual machine file system (VMFS), the method comprising:

generating logical transactions for a scatter-gather array of the write IO operation having updates to metadata of the VMFS for the file;

estimating, for the logical transactions, common space reservations for those of the updates to common fields in the metadata of the VMFS for the file;

estimating, for the logical transactions, exclusive space reservations for those of the updates to exclusive fields in the metadata of the VMFS for the file;

batching the logical transactions into a physical transaction, the physical transaction including a single reservation of space in a journal of the VMFS based on the common space reservations and a reservations of space in the journal of the VMFS for each of the exclusive space reservations, respectively; and executing the physical transaction to commit the updates to the metadata of the VMFS to the journal of the VMFS.

8. The non-transitory computer readable medium of claim 7, wherein the common fields and the exclusive fields are fields in a plurality of data structures having the metadata of the VMFS for the file.

9. The non-transitory computer readable medium of claim 8, wherein the plurality of data structures include file descriptors, pointer blocks, and resource cluster headers.

10. The non-transitory computer readable medium of claim 7, wherein the single reservation of space in the journal of the VMFS is determined from a union of the common space reservations of the logical transactions.

11. The non-transitory computer readable medium of claim 7, wherein the physical transaction includes aggregated updates to the common fields in the metadata of the VMFS aggregated from the logical transactions.

12. The non-transitory computer readable medium of claim 7, wherein the physical transaction includes individual updates to the exclusive fields in the metadata of the VMFS respectively from each of the logical transactions.

13. A host computer, comprising:

a processor and a memory; and a hypervisor executing on the processor and the memory, the hypervisor configured to handling a write input/output (IO) operation to a file on a storage device having a virtual machine file system (VMFS) by:

generating logical transactions for a scatter-gather array of the write IO operation having updates to metadata of the VMFS for the file;

estimating, for the logical transactions, common space reservations for those of the updates to common fields in the metadata of the VMFS for the file;

estimating, for the logical transactions, exclusive space reservations for those of the updates to exclusive fields in the metadata of the VMFS for the file;

batching the logical transactions into a physical transaction, the physical transaction including a single reservation of space in a journal of the VMFS based on the common space reservations and a reservations of space in the journal of the VMFS for each of the exclusive space reservations, respectively; and executing the physical transaction to commit the updates to the metadata of the VMFS to the journal of the VMFS.

14. The host computer of claim 13, wherein the common fields and the exclusive fields are fields in a plurality of data structures having the metadata of the VMFS for the file.

15. The host computer of claim 14, wherein the plurality of data structures include file descriptors, pointer blocks, and resource cluster headers.

16. The host computer of claim 13, wherein the single reservation of space in the journal of the VMFS is determined from a union of the common space reservations of the logical transactions.

17. The host computer of claim 13, wherein the physical transaction includes aggregated updates to the common fields in the metadata of the VMFS aggregated from the logical transactions.

18. The hosts computer of claim 13, wherein the physical transaction includes individual updates to the exclusive fields in the metadata of the VMFS respectively from each of the logical transactions.

* * * * *